(12) United States Patent
Zamir

(10) Patent No.: US 9,747,944 B2
(45) Date of Patent: Aug. 29, 2017

(54) ZEOTROPE ANIMATION DISC ASSEMBLY

(71) Applicant: BOSE CORPORATION, Framingham, MA (US)

(72) Inventor: Lee Zamir, Framingham, MA (US)

(73) Assignee: BOSE CORPORATION, Framingham, MA (US)

(*) Notice: Subject to any disclaimer, the term of this patent is extended or adjusted under 35 U.S.C. 154(b) by 0 days.

(21) Appl. No.: 14/674,190

(22) Filed: Mar. 31, 2015

(65) Prior Publication Data

US 2016/0295156 A1    Oct. 6, 2016

(51) Int. Cl.
| | |
|---|---|
| *H04N 5/93* | (2006.01) |
| *G11B 27/00* | (2006.01) |
| *H04N 5/84* | (2006.01) |
| *H04N 5/89* | (2006.01) |
| *G11B 27/026* | (2006.01) |
| *G09F 19/12* | (2006.01) |
| *G03B 25/00* | (2006.01) |
| *H04N 5/76* | (2006.01) |

(52) U.S. Cl.
CPC ............ *G11B 27/026* (2013.01); *G03B 25/00* (2013.01); *G09F 19/12* (2013.01); *H04N 5/76* (2013.01)

(58) Field of Classification Search
USPC .......................................... 386/282, 334–335
See application file for complete search history.

(56) References Cited

U.S. PATENT DOCUMENTS

| | | | | |
|---|---|---|---|---|
| 5,870,364 | A * | 2/1999 | Raczynski | G11B 19/12 369/14 |
| 6,269,220 | B1 * | 7/2001 | Jeong | G11B 20/10527 348/716 |
| 6,714,209 | B2 * | 3/2004 | Van Valer | G06F 17/3028 345/629 |
| 8,373,842 | B1 * | 2/2013 | Seder | G03B 25/00 352/101 |
| 8,482,714 | B1 * | 7/2013 | Seder | G09F 19/12 352/87 |
| 8,656,144 | B2 * | 2/2014 | Kang | H04N 5/783 348/441 |
| 2005/0046817 | A1 * | 3/2005 | Wolfe | G11B 7/24094 355/54 |
| 2006/0029729 | A1 * | 2/2006 | Myers | B41M 7/0027 427/162 |
| 2007/0110158 | A1 * | 5/2007 | Maeda | H04N 19/139 375/240.16 |
| 2010/0201949 | A1 * | 8/2010 | Barnett | G03B 25/00 352/101 |
| 2010/0277696 | A1 * | 11/2010 | Huebner | B60K 35/00 352/81 |

* cited by examiner

*Primary Examiner* — Nigar Chowdhury
(74) *Attorney, Agent, or Firm* — Patterson + Sheridan, LLP

(57) ABSTRACT

Zeotropic effects are created while an observer experiments with video data and speed controls of a rotary motor. A system facilitates user creation of a customized zoetrope animation disc by enabling a user to take a video of a repetitive motion (e.g., a person doing a jumping jack, a hand opening and closing, a person swinging back and forth on a swing, etc.). The system prompts a user to select a start point and end point to the video. The system further prompts the user to specify a number of frames desired for the animation disc. The animation disc is then printed for use on a rotary motor based on the user input.

20 Claims, 10 Drawing Sheets

US 9,747,944 B2

ZEOTROPE ANIMATION DISC ASSEMBLY

I. FIELD OF THE DISCLOSURE

The present disclosure relates generally to instructional games, and more particularly, to a zoetrope and animation-effects related technologies.

II. BACKGROUND

With the prevalence of mobile computing devices, children are introduced to computing technology at a younger age. For example, it is common for a child to be proficient in operating a mobile telephone or a tablet computer. Thus, at a fairly young age, children often have familiarity with certain aspects of audio, video, and communications technology.

III. SUMMARY OF THE DISCLOSURE

In selected examples, a system includes a memory storing video data and program code and a controller having access to the memory. The controller executes the program code to receive user input setting a number of frames of the video data to be included in an animation disc. The controller automatically selects frames of the video data for inclusion in the animation disc based on the user input. The controller further initiates generation of a printable file that includes the animation disc.

In another aspect, a system includes a memory storing video data and program code and a controller having access to the memory. The controller executes the program code to receive user input that sets at least one of a start point and an end point of the video data to be included in an animation disc. The controller further automatically selects frames of the video data for inclusion in the animation disc based on the user input. The controller initiates generation of a printable file that includes the animation disc.

In another example, a system includes a rotary motor and a controller to receive user input setting at least one of a start point and an end point of the video data to be included in an animation disc to be actuated by the rotary motor. The user input additionally specifies a number of frames to be included in the animation disc. The controller automatically selects frames of the video data for inclusion in the animation disc based on the user input. The controller further initiates generation of a printable file that includes the animation disc.

Other features, objects, and advantages will become apparent from the following detailed description and drawings.

IV. BRIEF DESCRIPTION OF THE DRAWINGS

V. DETAILED DESCRIPTION

Zeotropic effects are created while an observer experiments with video data and speed controls of a rotary motor. A system facilitates user creation of a customized zoetrope animation disc by enabling a user to take a video of a repetitive motion (e.g., a person doing a jumping jack, a hand opening and closing, a person swinging back and forth on a swing, etc.). The system prompts a user to select a start point and end point to the video. The system further prompts the user to specify a number of frames desired for the animation disc. The animation disc is then printed for use on a rotary motor based on the user input.

Figure 1:
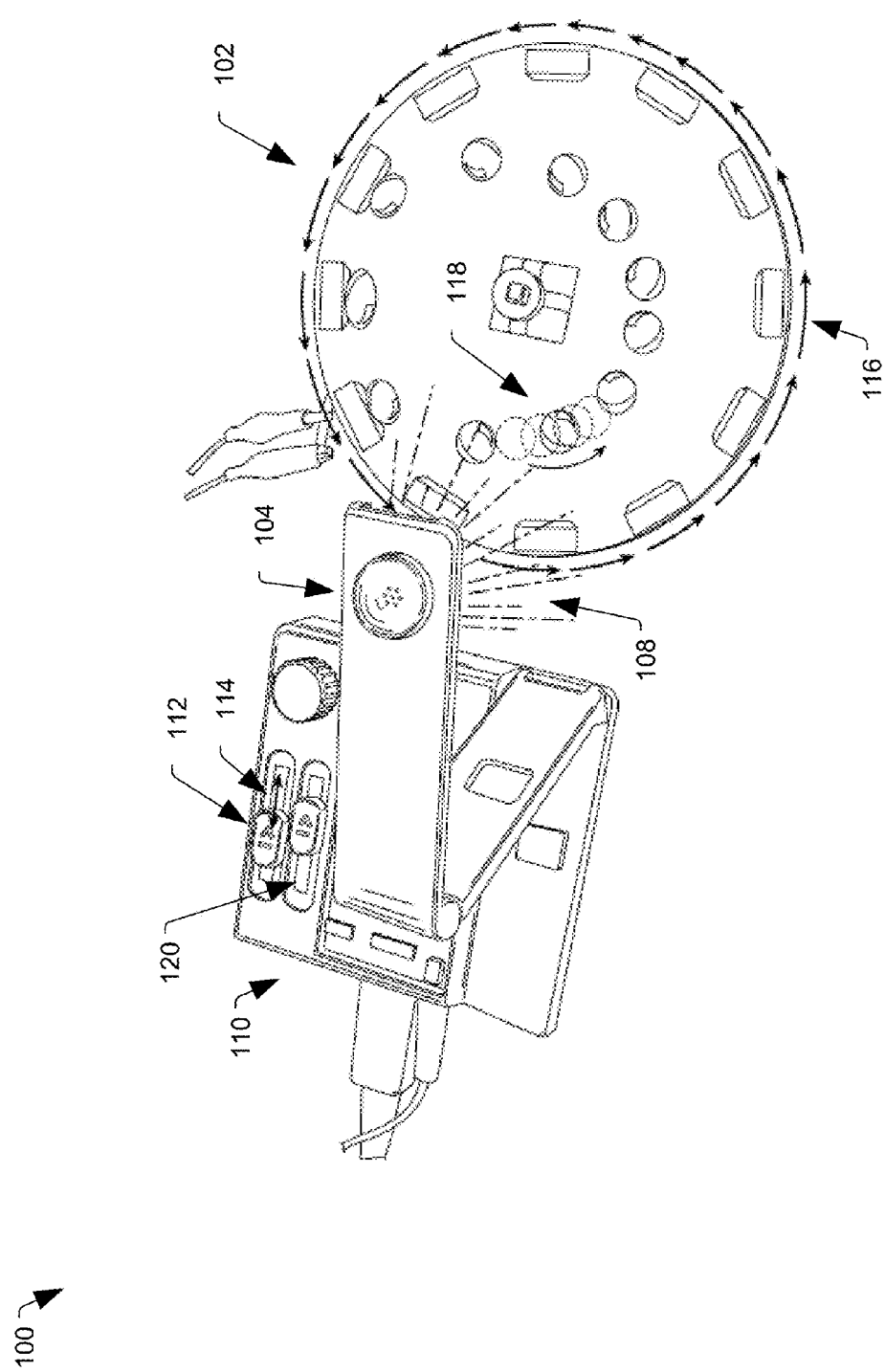
FIG. 1 illustrates an example of an animation disc being rotated at a particular rotation rate while being illuminated with light that is emitted by a strobe light at a particular pulse rate to create an optical illusion.

FIG. 1 is a system 100 that includes a strobe light 104 that emits a flashing light in a direction of an animation disc 102, as shown at 108. When the strobe light 104 and the speed of rotation of the animation disc 102 are out of synchronization with a single cycle of rotation (e.g., a flash at every full rotation, plus one sixth of a rotation), the design pattern appears to move in a particular direction to an observer. Animation of the design pattern is presented to an observer. Similarly, a flash that is coordinated to a fraction less than a full rotation causes the design pattern to appear to progress in another direction.

The system 100 includes a rotary motor controller 112 that controls a frequency of rotation of a motor (i.e., revolutions per second). The system 100 further includes a strobe flash controller 120 that controls a frequency of the strobe light (illuminations per second).

FIG. 1 illustrates that, while the strobe light 104 is illuminating the animation disc 102 with pulsing light (as shown at 108), the user adjusts a rotation speed of the animation disc 102, as shown at 114. In the example illustrated in FIG. 1, the rotation of the animation disc 102 is in a counterclockwise direction, as shown at 116. The user adjusts the speed of rotation of the animation disc 102 using the motion controller 112 of the control unit 110 until the design pattern on the animation disc 102 creates an optical illusion (e.g., a travelling ball in this case), as shown at 118. FIGS. 5-13 (as described further herein) illustrate a sequence of views of the example animation disc 102 as the animation disc 102 rotates in the counterclockwise direction.

In the example illustrated in FIG. 1, the control unit 110 includes multiple controls. For example, the control unit 110 include a power control (e.g., a volume knob) that is rotated in one direction (e.g., in a clockwise direction) to turn on the control unit 110 and is rotated in another direction (e.g., in a counterclockwise direction) to turn off the control unit 110. In some instances, a light or other indicator is activated in order to identify to the user that the control unit 110 has been powered on (e.g., in response to the user rotating the power control). In the example of FIG. 1, the control unit 110 further includes a first interface to receive a power cable. The power cable receives power from a power supply (not shown in FIG. 1). For example, the power cable is connected to a wall outlet (not shown in FIG. 1) in order to provide power to the control unit 110. The control unit 110 also includes a second interface to receive a control cable. In the example illustrated in FIG. 1, a first end of the control cable is electrically connected to the second interface of the control unit 110, and a second end of the control cable is electrically connected to a motor adapter (partially obscured from view in FIG. 1).

Thus, the control unit 110 receives power from a power supply via the power cable and selectively provides current to a coil (see e.g., the coil 206 of FIG. 2) via the control cable. Further, as described below with respect to FIGS. 3 and 4, the motion controller 112 (also referred to as a motion slider) allows a user to adjust a rotation speed by varying a current that is provided from the control unit 110 to the coil via the control cable (e.g., that is electrically connected to the wires 408, 410 as shown in FIG. 4). In some cases, the user increases the current that is provided to the coil and thereby increases the rotation speed of the adjacent rotor by sliding the motion controller 112 in a first direction (e.g., toward a side of the control unit 110 that includes the interfaces to receive the power cable and the control cable). Alternatively, the user decreases the current that is provided to the coil and thereby reduces the rotation speed of the adjacent rotor by sliding the motion controller 112 in a second direction (e.g., toward another side of the control unit 110).

Each of the motor frequency controller 112 and the strobe frequency controller 120 comprises a potentiometer, or slider-type control. The increases or decreases the frequency of the rotary motor by sliding the slider-type control, and likewise controls the frequency of the strobe light 104 by sliding the slide-type control 120 associated with the strobe light 104.

Figure 2:
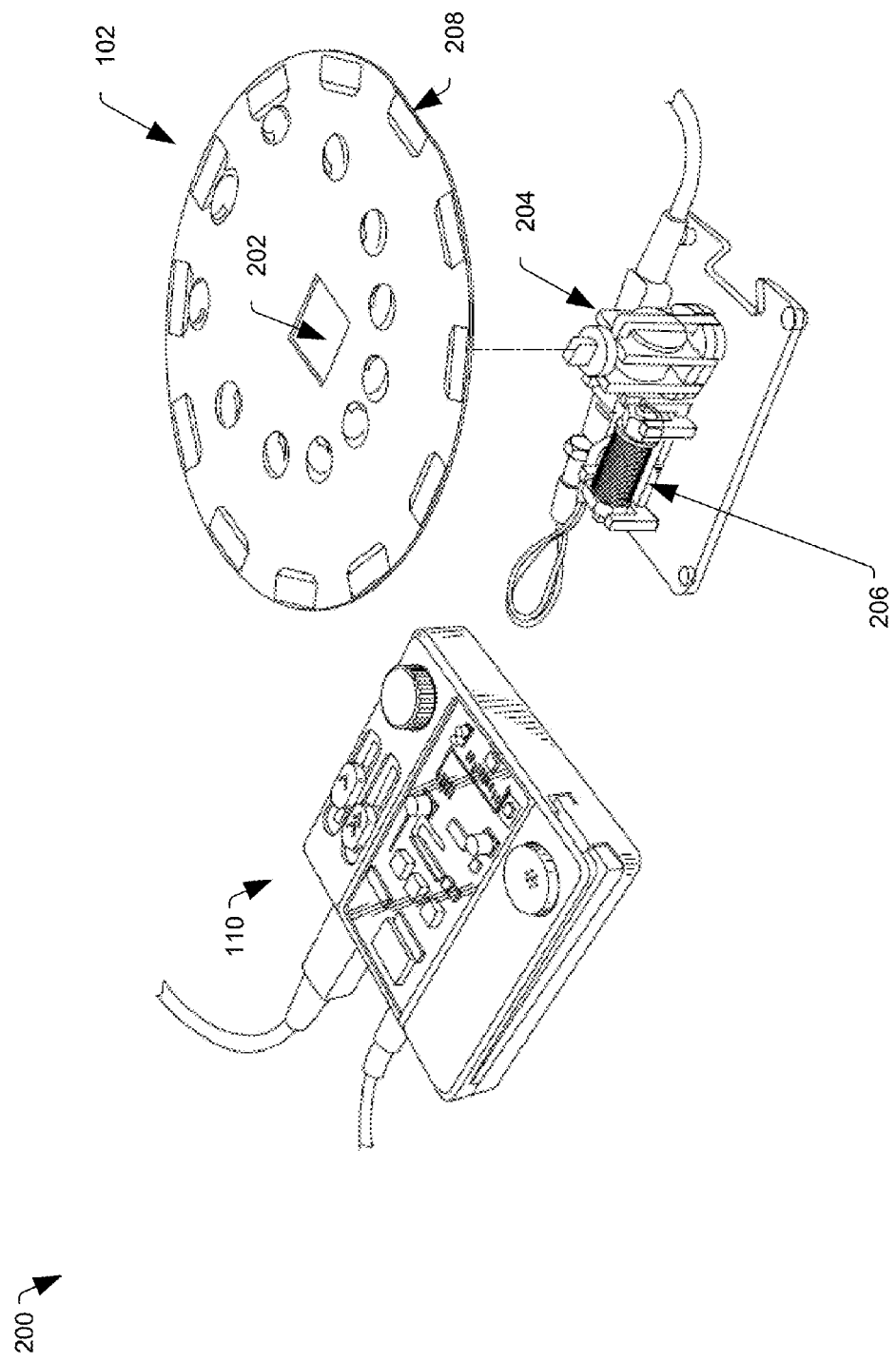
FIG. 2 illustrates an example of an animation disc that includes a design pattern that creates an optical illusion when rotated at a particular rate and illuminated with a strobe light that pulses light at a particular pulse rate.

FIG. 2 is a view 200 of an example of the animation disc 102 of FIG. 1 that includes a design pattern. The design pattern creates the optical illusion 118 shown in FIG. 1 when the animation disc 102 is rotated at a particular speed while exposed to a strobe light. The animation disc 102 includes a central hole 202 (e.g., a substantially square, rectangular, or circular hole) that allows the animation disc 102 to be coupled to a rotor 204. The control unit 110 is used to control a speed of rotation of the rotor 204 and thereby control the speed of rotation of the animation disc 102. Further, in some cases the user manually initiates rotation of the rotor 204, and the control unit 110 subsequently controls the speed of rotation of the rotor 204 by varying the amount of current that is provided to a coil 206.

In some cases, the animation disc 102 is a sheet of paper, thin plastic, cardboard, or some other lightweight material upon which the system has printed the design pattern based on instructions. FIG. 2 illustrates a particular example in which the animation disc 102 includes a design pattern associated with a travelling ball.

As described further with respect to FIG. 1, the control unit 110 includes the strobe light 104 that is moved from a storage position to an operating position (as shown in FIG. 1) in order to illuminate the animation disc 102. The animation disc 102 is moved at a particular rate such that the design pattern on the animation 102 creates the optical illusion 118. In the case of the travelling ball design, the rotation of the animation disc 102 at a particular rate (and based on a pulse rate of the strobe light 104) creates an optical illusion of a ball bouncing.

As another example (shown in FIG. 14), a design pattern creates an optical illusion of a galloping horse.

Due to the difficulty of illustrating an optical illusion, the particular animation disc 102 shown in FIG. 2 includes a portion 208 that has been illustrated as substantially linear for references purposes only in order to describe the rotation of the animation disc 102. However, it will be appreciated that the animation disc 102 has a substantially circular shape or some other shape. As shown in FIG. 2, a user positions the animation disc 102 such that the central hole 202 substantially aligns with the rotor 204. In some instances, the central hole 202 has dimensions that correspond to a diameter of a disc (shown at the top of the rotor 204 in FIG. 2) such that the animation disc 102 is positioned adjacent to the rotor 204 and rotates at substantially the same speed as the rotor 204 (e.g., based on the amount of current that is provided to the coil 206 via the control unit 110).

The rotor 204 includes a magnet that rotates around a pivot (e.g., a bearing that is positioned within a base structure beneath the rotor 204, with the bearing obscured from view in the perspective view of FIG. 2). A magnet support includes sections that snap together to allow the magnet to rotate around the pivot. The magnet support additionally snaps into the base structure. Similarly, the coil 206 is snapped into a coil support that snaps or otherwise attaches to the base structure. In some cases, the coil 206 is a single coil (e.g., comprising copper) that is wound by a user or that is pre-wound for the user. Current flowing through the coil 206 is manipulated such that the magnet is induced to rotate on the pivot. The coil 206 is coupled to wires for connection with a power source to provide direct current (DC) or alternating current (AC) to the coil 206, resulting in an electromagnetic rotary motor. FIG. 2 illustrates that the coil 206 is positioned within the coil cradle such that the wires are positioned away from the rotor 204 in order to allow the magnet to rotate with respect to the base structure.

Figure 3:
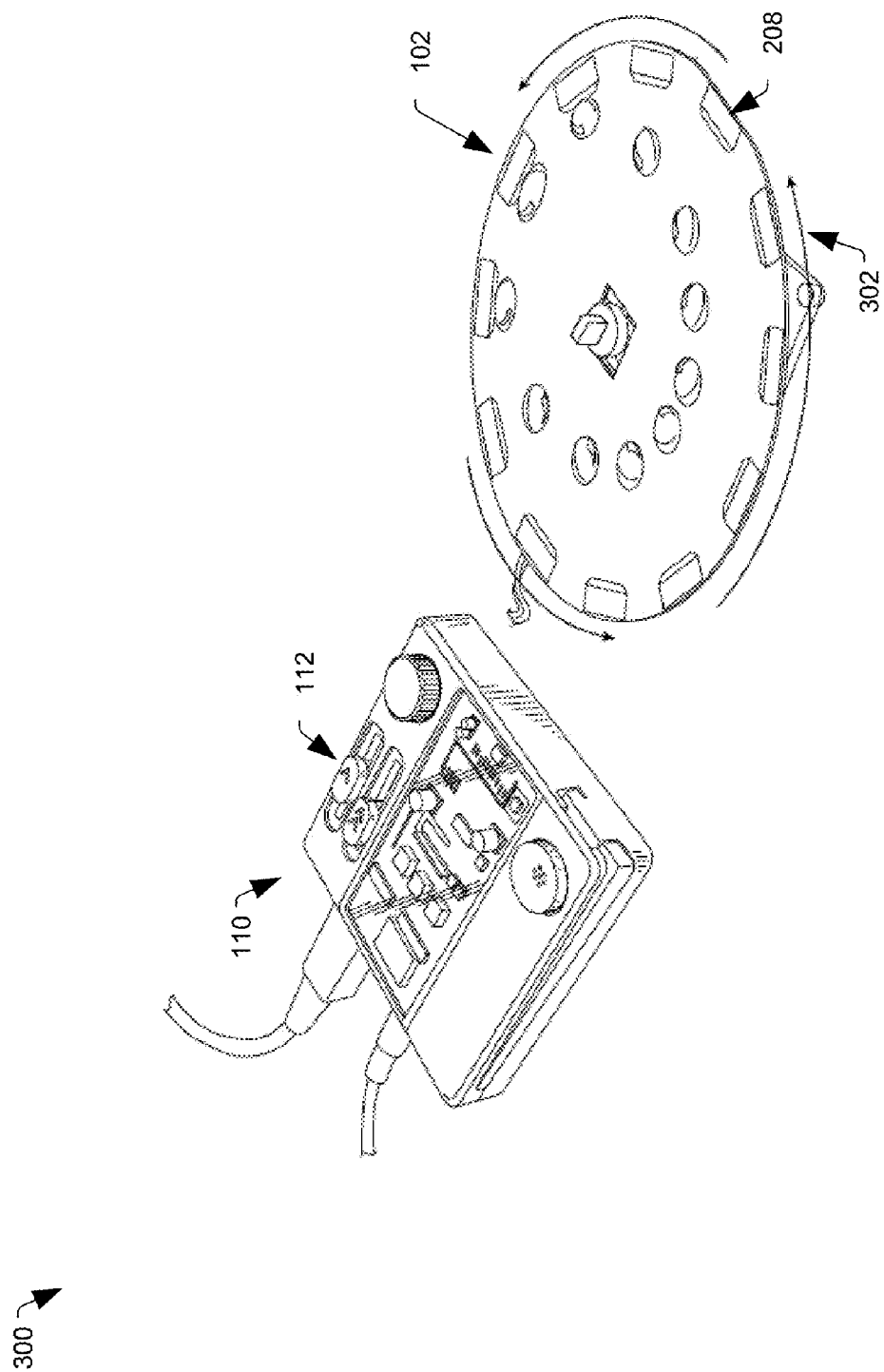
FIG. 3 illustrates the animation disc of FIG. 2 being rotated in a particular direction (e.g., a counterclockwise direction) at a first rate.
Figure 4:
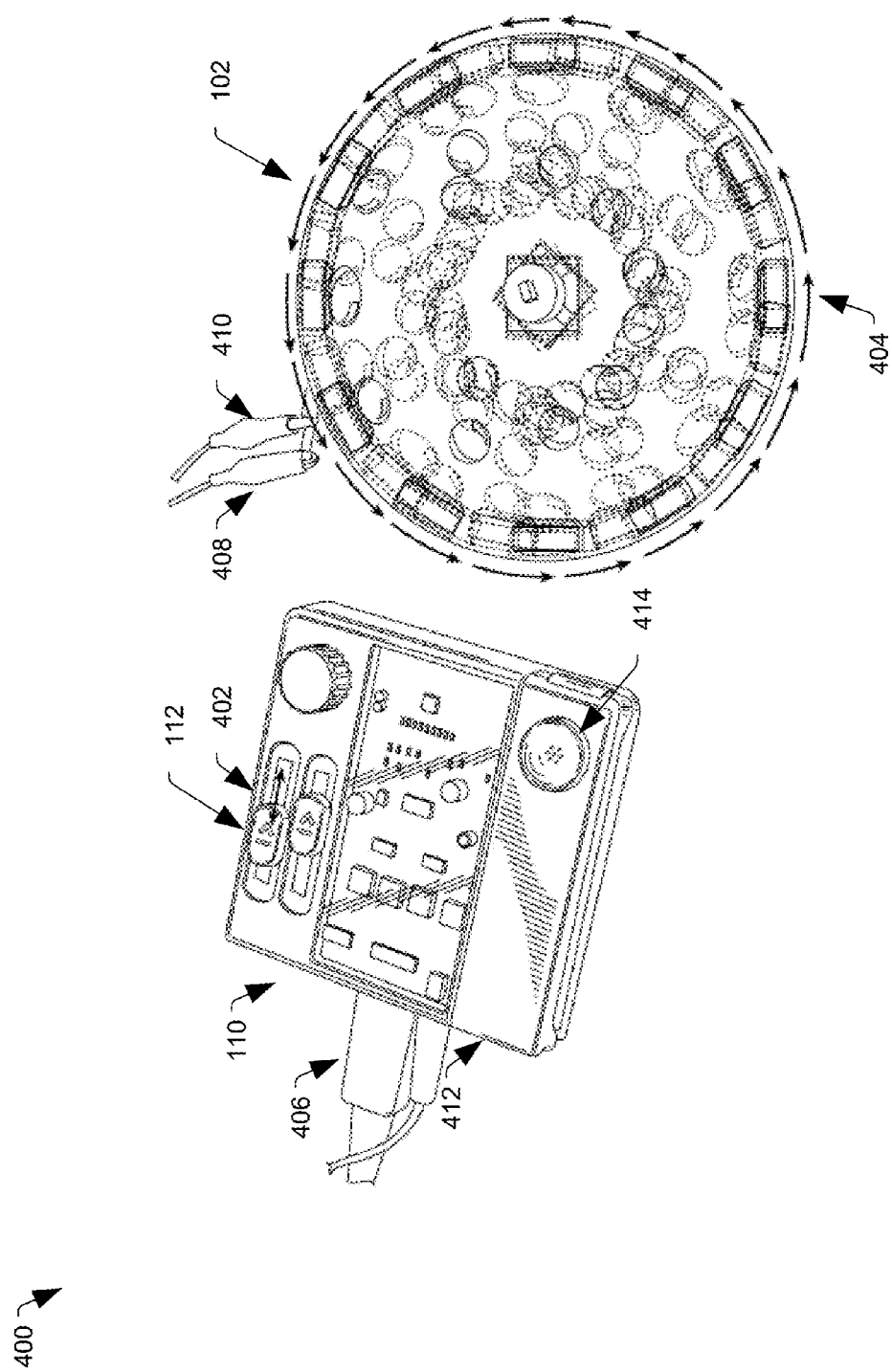
FIG. 4 illustrates the animation disc of FIG. 2 being rotated in a particular direction (e.g., a counterclockwise direction) at a second rate (e.g., at an increased speed)

In some cases, the current flowing through the coil 206 induces the rotor 204 to rotate in a particular direction (e.g., counterclockwise in the example of FIGS. 3 and 4). Alternatively, in some cases, the user manually initiates the rotation of the rotor 204. For example, the user spins the rotor 204 by grasping a disc at the top of the rotor 204 between a thumb and a forefinger and spinning the rotor 204 in a counterclockwise direction with respect to the base structure. In either case, once the rotor 204 has begun to spin, the user adjusts a rotation speed using a motion controller 112 of the control unit 110 (as described further with respect to FIGS. 3 and 4).

FIG. 3 is a view 300 of the animation disc 102 after the animation disc 102 has been positioned atop the rotor 204 of FIG. 2 (obscured from view in FIG. 3) such that the animation disc 102 rotates. As an illustrative, non-limiting example, FIG. 3 illustrates that the control unit 110 provides current to the coil 206 (obscured from view in FIG. 3) such that the animation disc 102 rotates in a counterclockwise direction, as shown at 302. However, it will be appreciated that in alternative instances, the control unit 110 causes the animation disc 102 to rotate in a clockwise direction. Further, as described above, the motion controller 112 of the control unit 110 is used to adjust the speed of rotation of the rotor 204 (and the attached animation disc 102) by varying the amount of current that is provided to the coil 206.

In some cases, the rotor 204 begins to shake in response to current being provided to the coil 206 from the control unit 110. In other cases, the rotor 204 begins to rotate (e.g., in a counterclockwise direction in the example of FIG. 3) responsive to the current being provided to the coil 206. Alternatively, in some cases, the user manually spins the rotor 204 in order to initiate the rotation (e.g., by grasping the disc between a thumb and a forefinger and spinning the rotor 204 in a clockwise direction with respect to the base structure). In either case, once the rotor 204 has begun to spin, the user adjusts the rotation speed using the motion controller 112 of the control unit 110.

FIG. 4 is a view 400 of the animation disc 102 after the user has adjusted a speed of rotation using the motion controller 112 of the control unit 110, as shown at 402. In the example of FIG. 4, the user has increased the speed of rotation of the animation disc 102 in the counterclockwise direction, as shown at 404. FIG. 4 illustrates that the increased rotation speed of the animation disc 102 causes the design pattern to appear blurry to the user.

FIG. 4 further illustrates an example in which a control cable 406 of the control unit 110 is electrically connected to the coil 206 via alligator clips 408 and 410. As described in FIG. 1, the control unit 110 includes the strobe light 104 that is shown in a storage position in FIG. 4, at 412. A handle 414 is used to move the strobe light 104 from the storage position to an operating position (as shown in FIG. 1).

In some cases, the user decreases the rotation speed by moving the motion controller 402 in a second direction (e.g., in a downward direction). In this case, the movement of the motion controller 112 in the second direction results in the control unit 110 reducing the current that is provided to the coil 206 via the control cable. While FIG. 4 illustrates an example in which the motion controller 112 is adjustable in an up/down direction, in alternative implementations the control unit 110 includes an alternative speed adjustment controller (e.g., a rotatable dial or a graphical user interface, among other alternatives).

Figure 5:
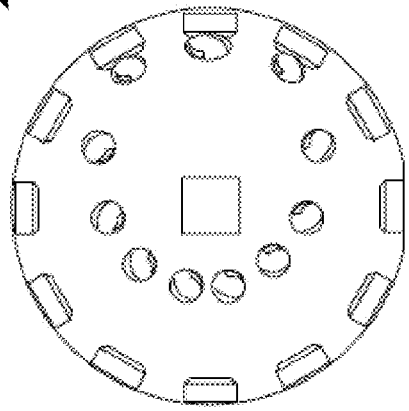
FIG. 5 illustrates a first view of the animation disc of FIG. 1 as it rotates in a particular direction in order to create the optical illusion.

Referring to FIG. 5, a first view of the animation disc 102 is illustrated and generally designated 500. As described above with respect to FIGS. 2 and 3, the portion 208 of the animation disc 102 that is illustrated as substantially linear is used as a reference point in order to show the relative positioning of particular portions of the design pattern as the animation disc 102 rotates in the counterclockwise direction. The view 500 illustrated in FIG. 5 corresponds to a first position of the animation disc 102 with respect to the rotor 204, as shown in FIGS. 2 and 3.

Figure 6:
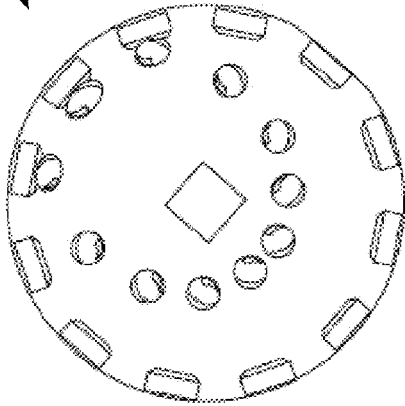
FIG. 6 illustrates a second view of the animation disc of FIG. 1 as it rotates in a particular direction in order to create the optical illusion.
Figure 7:
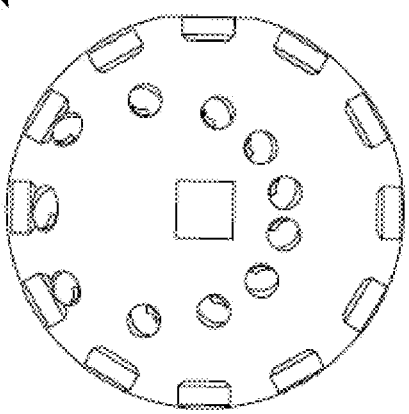
FIG. 7 illustrates a third view of the animation disc of FIG. 1 as it rotates in a particular direction in order to create the optical illusion.
Figure 8:
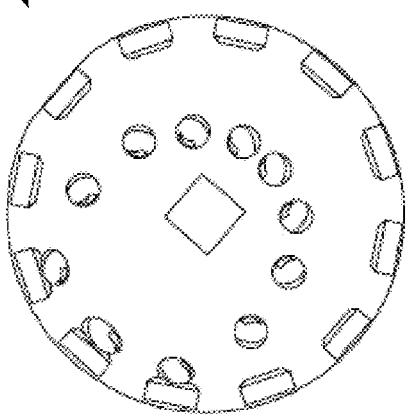
FIG. 8 illustrates a fourth view of the animation disc of FIG. 1 as it rotates in a particular direction in order to create the optical illusion.

Referring to FIG. 6, a second view of the animation disc 102 is illustrated and generally designated 600. With respect to FIG. 5, the animation disc 102 has rotated substantially forty-five degrees in the counterclockwise direction. Referring to FIG. 7, a third view of the animation disc 102 is illustrated and generally designated 700. With respect to FIG. 6, the animation disc 102 has rotated substantially forty-five degrees in the counterclockwise direction. Referring to FIG. 8, a fourth view of the animation disc 102 is illustrated and generally designated 800. With respect to FIG. 7, the animation disc 102 has rotated substantially forty-five degrees in the counterclockwise direction.

Figure 9:
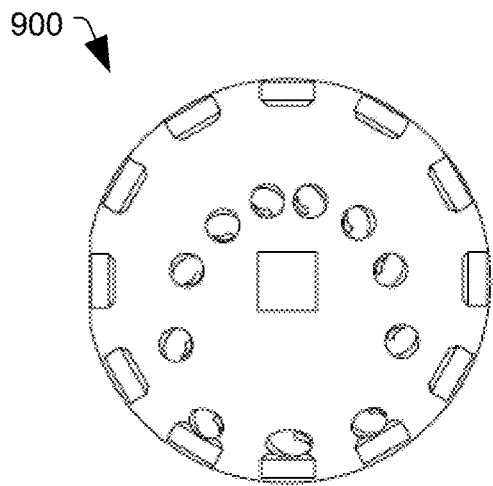
FIG. 9 illustrates a fifth view of the animation disc of FIG. 1 as it rotates in a particular direction in order to create the optical illusion.
Figure 10:
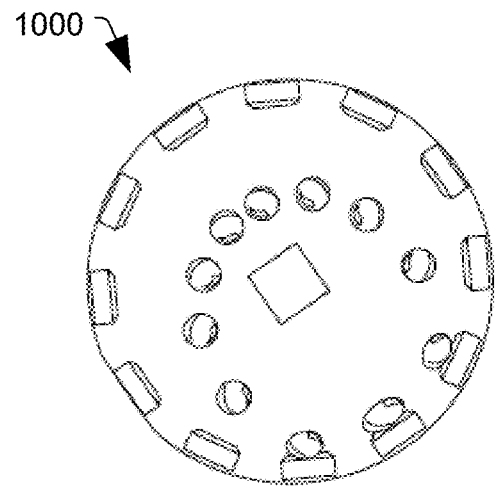
FIG. 10 illustrates a sixth view of the animation disc of FIG. 1 as it rotates in a particular direction in order to create the optical illusion.
Figure 11:
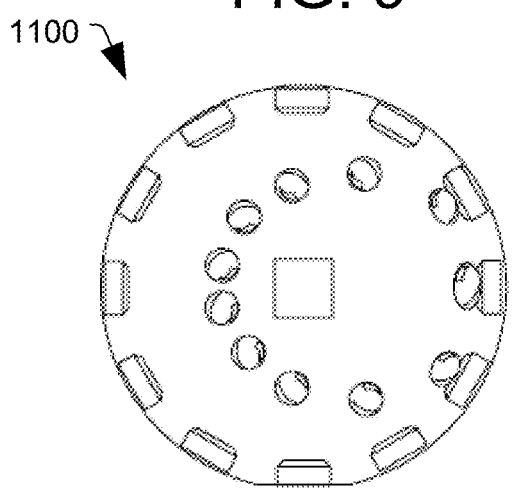
FIG. 11 illustrates a seventh view of the animation disc of FIG. 1 as it rotates in a particular direction in order to create the optical illusion.
Figure 12:
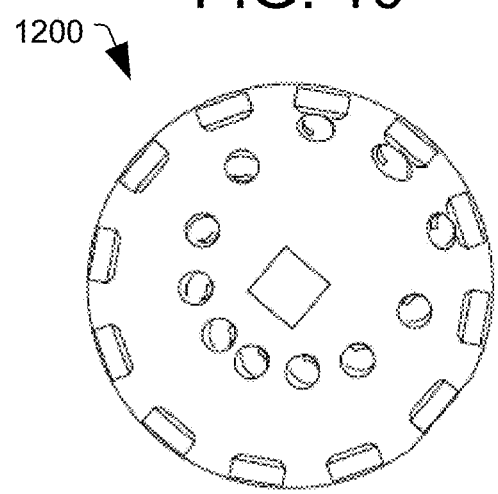
FIG. 12 illustrates a eighth view of the animation disc of FIG. 1 as it rotates in a particular direction in order to create the optical illusion.

Referring to FIG. 9, a fifth view of the animation disc 102 is illustrated and generally designated 900. With respect to FIG. 8, the animation disc 102 has rotated substantially forty-five degrees in the counterclockwise direction. Referring to FIG. 10, a sixth view of the animation disc 102 is illustrated and generally designated 1000. With respect to FIG. 9, the animation disc 102 has rotated substantially forty-five degrees in the counterclockwise direction. Referring to FIG. 11, a seventh view of the animation disc 102 is illustrated and generally designated 1100. With respect to FIG. 10, the animation disc 102 has rotated substantially forty-five degrees in the counterclockwise direction. Referring to FIG. 12, an eighth view of the animation disc 102 is illustrated and generally designated 1200. With respect to FIG. 11, the animation disc 102 has rotated substantially forty-five degrees in the counterclockwise direction.

Figure 13:
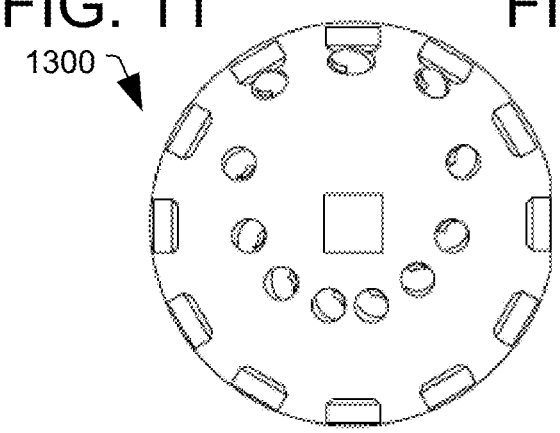
FIG. 13 illustrates a ninth view of the animation disc of FIG. 1 as it rotates in a particular direction in order to create the optical illusion.

Referring to FIG. 13, a ninth view of the animation disc 102 is illustrated and generally designated 1300. With respect to FIG. 12, the animation disc 102 has rotated substantially forty-five degrees in the counterclockwise direction. As a result of the rotation, the animation disc 102 has completed a single rotation and has returned to the initial position illustrated in FIG. 5.

Figure 14:
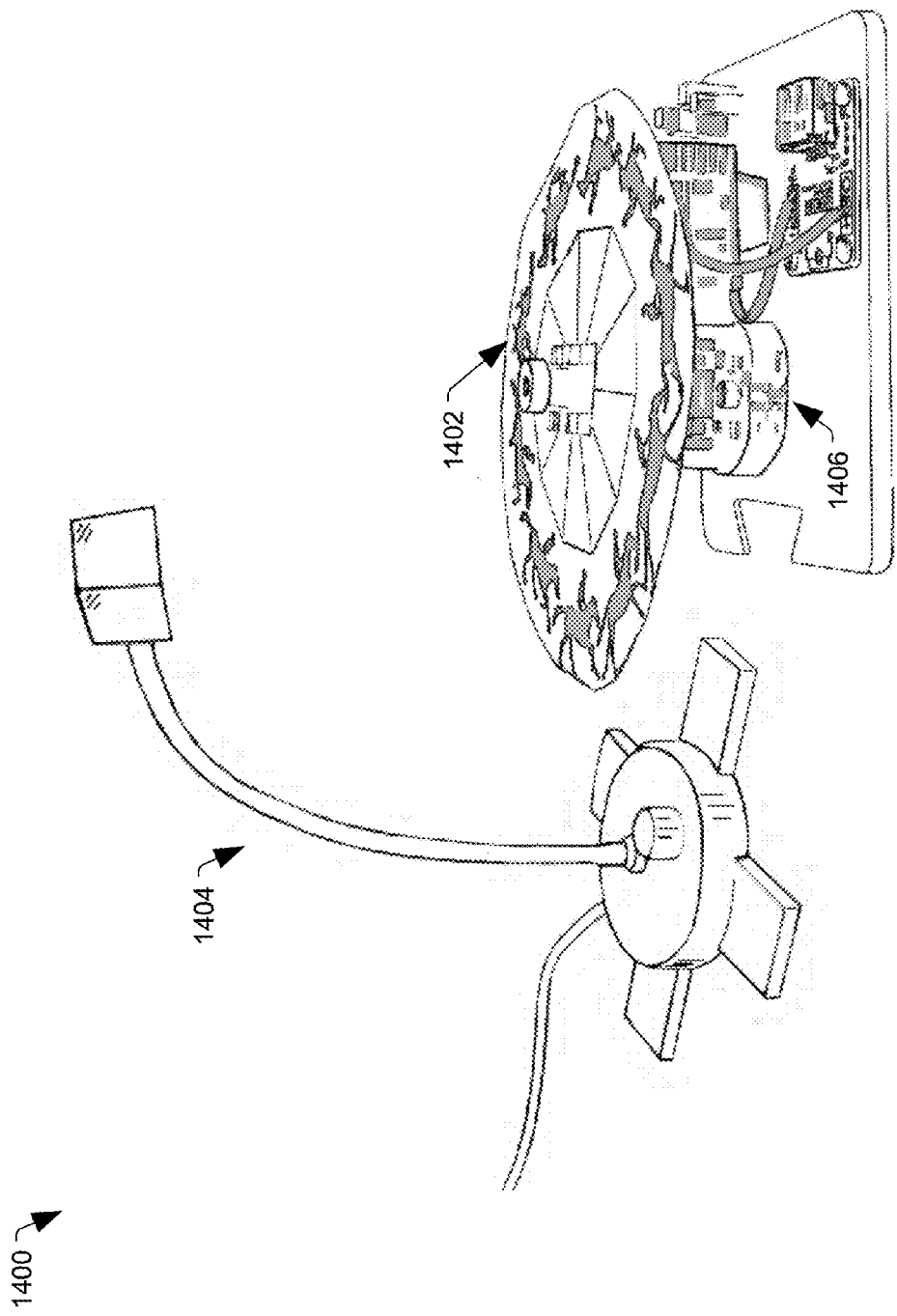
FIG. 14 illustrates a view of an animation disc illuminated by a standalone strobe light.

FIG. 14 shows an animation disc 1402 illuminated by a standalone strobe light 1404. A design on the animation disc 1402 depicts a galloping horse. That is, the frequencies of the strobe light 1404 and a rotary motor 1406 are manually and automatically synchronized to create that optical effect of a horse galloping.

Figure 15:
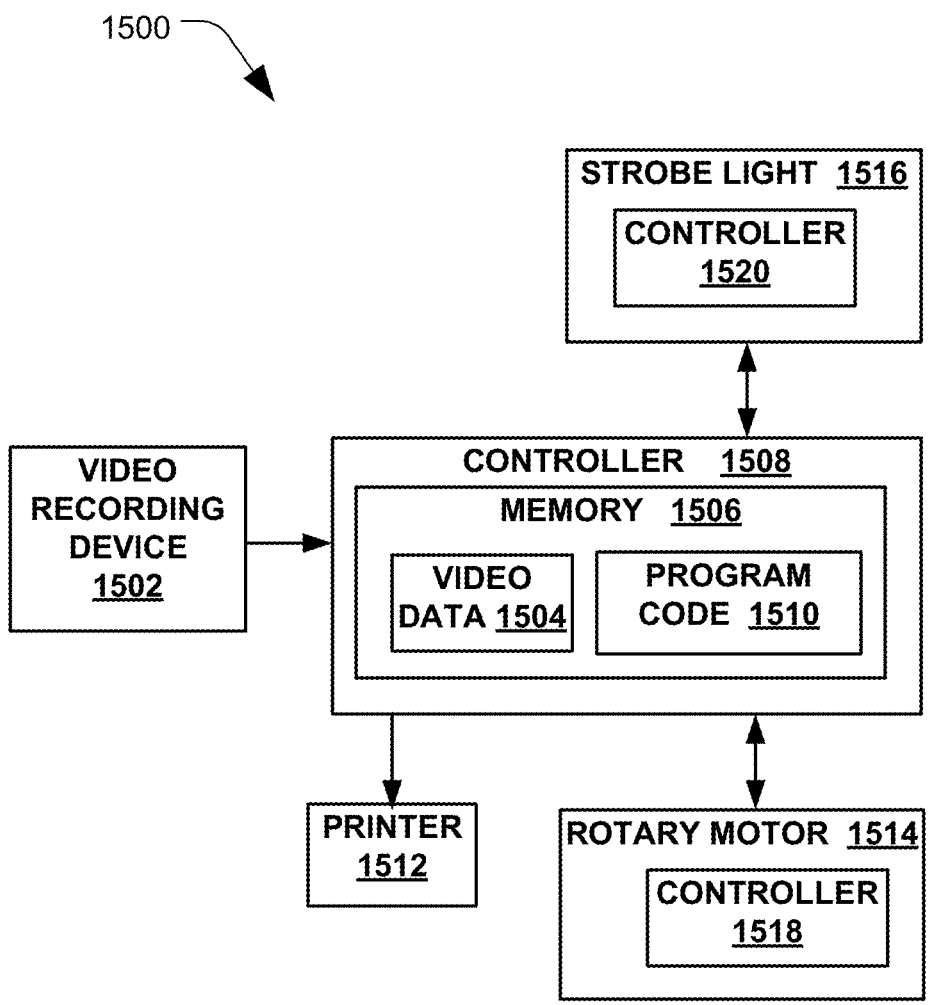
FIG. 15 is a block diagram of a system that allows a user to create and experiment with a customized zoetrope.

FIG. 15 is a block diagram of a system 1500 that allows a user to create and experiment with a customized zoetrope. The system 1500 includes a video recording device 1502, such as a phone camera. The video data 1504 is downloaded and stored in a memory 1506 of a controller 1508. The controller 1508 comprises a computing device capable of storing and executing program code 1510.

The program code 1510 is executed by the controller 1508 to enable the user to select a starting point and an ending point for the video data 1504. A user is further prompted to select how many frames are desired on the animation disc. Based on this input, the controller 1508 selects frame from the video data 1504 for inclusion on the animation disc. The controller 1508 executes the program code 1510 to generate an animation disc file that is sent to a printer 1512.

The user cuts out the animation disc from the printed paper and mounts the animation disc on the rotary motor 1514. By manipulating the rotary motor 1514 and the strobe light 1516 (using a controller 1506, 1518, 1520), the user is able to create the illusion of animation of their filed subject.

Figure 16:
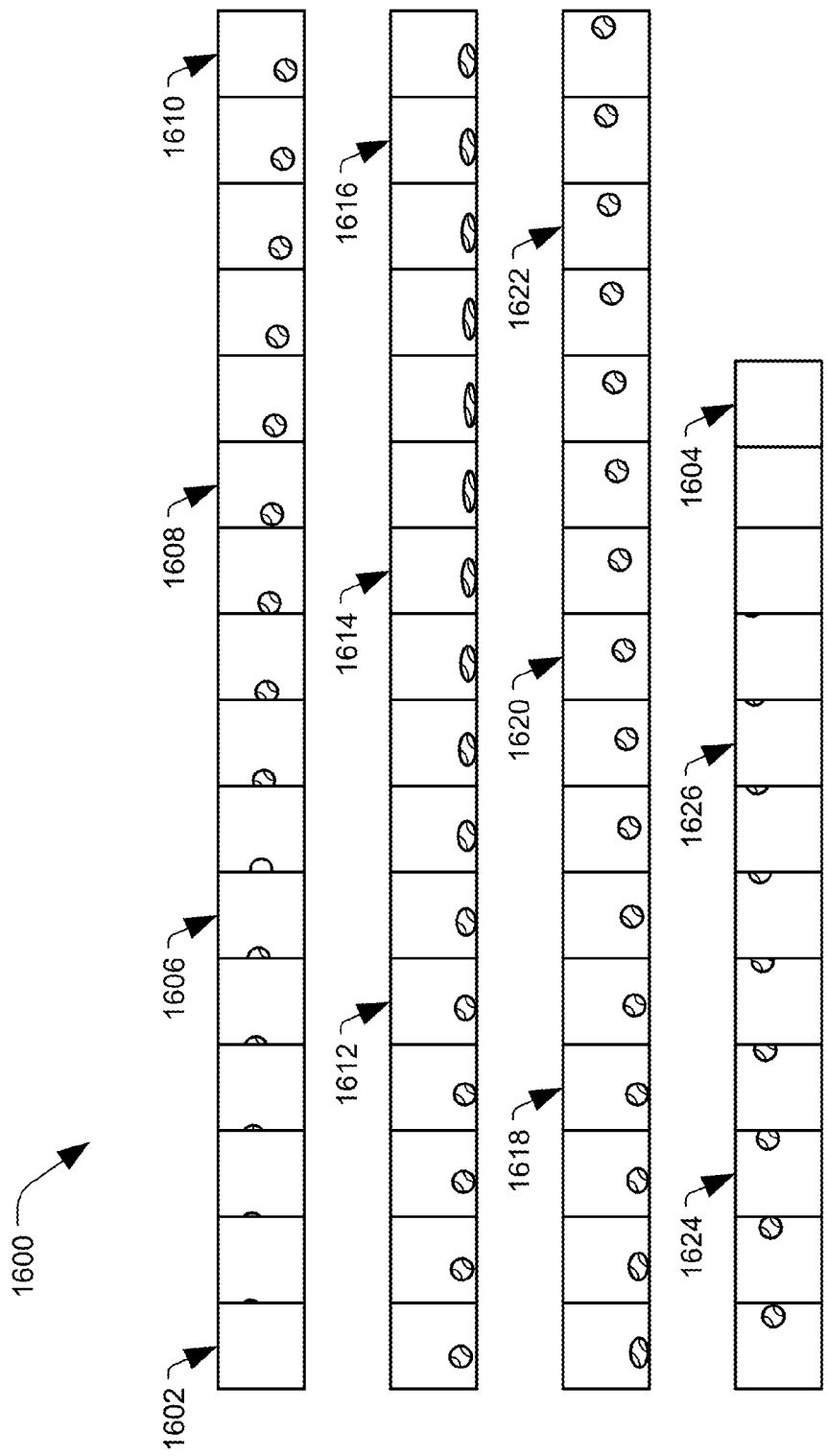
FIG. 16 shows video frame data, such as that captured by the video recording device of FIG. 15 and as used to populate the sectors of a printed animation disc.

FIG. 16 shows video frame data 1600, such as that captured by the video recording device 102 shown in FIG.

15 and as used to populate the sectors of a printed animation disc. The video frame data 1600 includes 60 frames recorded over a two second interval.

Using input controls, the user sets a beginning frame and an ending frame. For instance, the user selects frame 1602 as the first frame potentially used in the zoetrope, and frame 1604 as the last potentially included frame.

In an example, a user may elect to have 12 frames included in their customized zoetrope. In response to the user input, the system may determine that every fifth frame 1602, 1606, 1608, 1610, 1612, 1614, 1616, 1618, 1620, 1622, 1624, 1626 of the video frame data 1600 should be used. That is, 60 video data frames divided by 12 zoetrope frames equals 5 frames. The zoetrope of FIG. 3 includes 12 frames, similar to what would be generated under the illustrative user specified parameters and with the bouncing ball video frame data 1600. Where the number of requested zoetrope frames does not divide evenly into the number of video data frames, the system rounds to determine which video stills to sample.

Figure 17:
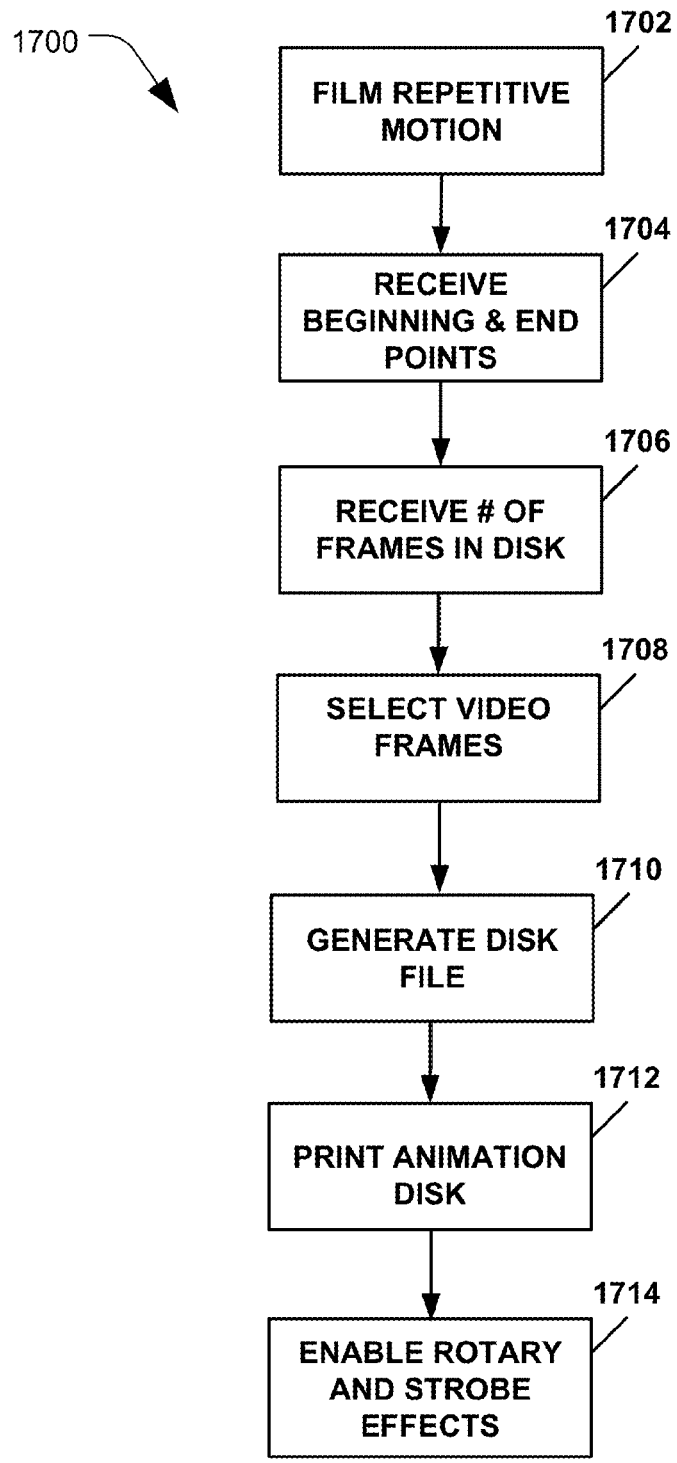
FIG. 17 is flowchart of a method of creating and using a customized zoetrope.

FIG. 17 is flowchart of a method 1700 of creating and using a customized zoetrope. At 1702, a user films (e.g., using a mobile phone, tablet, digital camera, video recorder, etc.) a video of something in motion and preferably something in repetitive motion, such as a ball bouncing, a person doing a jumping jack, a child swinging on a playground swing, or a hand opening and closing.

After capturing the video, the user inputs via an interface at 1704 an ending and a beginning frame for the video, thus defining a period for the animation disc. The user is also prompted to specify at 1706 how many of the video frames they want printed on their animation disc. For example, the user may be permitted to select between 6 and 12 frames to print on their animation disc. Alternatively, the user may be permitted to enter the number of frames they'd like printed on their disc.

Based on the number of frames in the user-defined period and the number of images to be included in the animation disc, the system automatically selects at 1708 frames for inclusion. For example, the system may select the selected number of frames at equal intervals in the user-defined period. The selected frames are saved at 1710 in an animation disc format in a file that the user may send to a printer at 1712. The animation disc is cut out and placed on the rotary motor at 1714. The user manipulates the strobe light to create the desired animation effect.

Examples described herein may take the form of an entirely hardware implementation, an entirely software implementation, or an implementation containing both hardware and software elements. The disclosed methods are implemented in software that is embedded in processor readable storage medium and executed by a processor that includes but is not limited to firmware, resident software, microcode, etc.

Further, examples take the form of a computer program product accessible from a computer-usable or computer-readable storage medium providing program code for use by or in connection with a computer or any instruction execution system. For the purposes of this description, a computer-usable or computer-readable storage medium includes an apparatus that tangibly embodies a computer program and that contains, stores, communicates, propagates, or transport s the program for use by or in connection with the instruction execution system, apparatus, or device.

In various examples, the medium includes an electronic, magnetic, optical, electromagnetic, infrared, or semiconductor system (or apparatus or device) or a propagation medium. Examples of a computer-readable storage medium include a semiconductor or solid state memory, magnetic tape, a removable computer diskette, a random access memory (RAM), a read-only memory (ROM), a rigid magnetic disc and an optical disc. Current examples of optical discs include compact disc-read only memory (CD-ROM), compact disc-read/write (CD-R/W) and digital versatile disc (DVD).

A data processing system suitable for storing and/or executing program code includes at least one processor coupled directly or indirectly to memory elements through a system bus. The memory elements include local memory employed during actual execution of the program code, bulk storage, and cache memories that may provide temporary or more permanent storage of at least some program code in order to reduce the number of times code must be retrieved from bulk storage during execution. Input/output or I/O devices (including but not limited to keyboards, displays, pointing devices, etc.) of an example are coupled to the data processing system either directly or through intervening I/O controllers. Network adapters are also coupled to the data processing system of the example to enable the data processing system to become coupled to other data processing systems or remote printers or storage devices through intervening private or public networks. Modems, cable modems, and Ethernet cards are just a few of the currently available types of network adapters.

The previous description of the disclosed examples is provided to enable any person skilled in the art to make or use the disclosed examples. Various modifications to these examples will be readily apparent to those skilled in the art, and the generic principles defined herein may be applied to other examples without departing from the scope of the disclosure. Thus, the present disclosure is not intended to be limited to the examples shown herein, but is to be accorded the widest scope possible consistent with the principles and features as defined by the following claims.

The invention claimed is:

1. A system comprising:
    a memory storing video data and program code; and
    a controller having access to the memory, the controller executing the program code to receive user input setting a number of frames of the video data to be printed on a surface of an animation disc, to automatically select frames of the video data for printing on the surface of the animation disc based on the user input, and to initiate generation of a file executable by a printer to print the animation disc, wherein the animation disc comprises at least one of paper, plastic and cardboard, and wherein the controller selects the frames of the video data according to a ratio of the number of frames to be printed on the surface of the animation disc to a total number of frames in the video data.

2. The system of claim 1, wherein the controller further receives user input setting a start point of the video data available to be printed on the surface of the animation disc.

3. The system of claim 1, wherein the controller further receives user input setting an end point of the video data available to be printed on the surface of the animation disc.

4. The system of claim 1, further comprising a handheld video recording device of a user that captures and downloads the video data.

5. The system of claim 1, further comprising the printer to print the animation disc.

6. The system of claim 5, further comprising a strobe light to flash in a direction of the rotary motor.

7. The system of claim 1, further comprising a rotary motor to rotate the animation disc.

8. The system of claim 1, wherein the frames form a design pattern that appears to move in one direction with respect to a base structure when a flashing rate of a light emitted by a strobe light is greater than a rotation rate of the design pattern with respect to the base structure.

9. The system of claim 8, wherein the design pattern appears to move in another direction with respect to the base structure when the flashing rate of the light emitted by the strobe light is less than the rotation rate of the design pattern with respect to the base structure.

10. The system of claim 1, wherein the animation disc has multiple sectors printed upon the surface, and wherein a design pattern comprises frames of the video data that are printed in individual sectors of the multiple sectors.

11. A system comprising:
a memory storing video data and program code; and
a controller having access to the memory, the controller executing the program code to receive user input that sets at least one of a start point and an end point of the video data to be printed on a surface of an animation disc, to automatically select frames of the video data for printing on the surface of the animation disc based on the user input, and to initiate generation of a file executable by a printer to print the animation disc, wherein the animation disc comprises at least one of paper, plastic and cardboard, wherein the frames form a design pattern that appears to move in one direction with respect to a base structure when a flashing rate of a light emitted by a strobe light is greater than a rotation rate of the design pattern with respect to the base structure.

12. The system of claim 11, further comprising a user interface to receive the user input.

13. The system of claim 11, wherein the controller further receives user input setting a number of frames of the video data to be printed on the surface of the animation disc.

14. The system of claim 11, further comprising instructions describing how to assemble at least one of the animation disc and a rotary motor configured to rotate the animation disc.

15. The system of claim 11, further comprising at least one of a strobe light or a zoetrope structure with slits to view the animation disc.

16. The system of claim 11, wherein the controller selects the frames of the video data according to a ratio of the number of frames to be printed on the surface of the animation disc to a total number of frames in the video data.

17. A system comprising:
a rotary motor; and
a controller to receive user input setting at least one of a start point and an end point of video data to be printed on a surface of an animation disc to be actuated by the rotary motor, wherein the user input additionally specifies a number of frames to be printed on the surface of the animation disc, wherein the controller further automatically selects frames of the video data for printing on the surface of the animation disc based on the user input, and initiates generation of a file executable by a printer to print the animation disc, wherein the animation disc comprises at least one of paper, plastic and cardboard, and wherein the frames form a design pattern that appears to move in one direction with respect to a base structure when a flashing rate of a light emitted by a strobe light is greater than a rotation rate of the design pattern with respect to the base structure.

18. The system of claim 17, wherein the controller executes a division operation to determine which frames of the video data to include in the animation disc.

19. The system of claim 17, wherein the video data is recorded by handheld device of a user.

20. The system of claim 17, wherein the frames form a design pattern that appears to move in one direction with respect to a base structure when a flashing rate of a light emitted by a strobe light is greater than a rotation rate of the design pattern with respect to the base structure.

* * * * *